United States Patent [19]

Suzuki et al.

[11] Patent Number: 4,797,828
[45] Date of Patent: Jan. 10, 1989

[54] ELECTRONIC CONTROL SYSTEM FOR INTERNAL COMBUSTION ENGINES

[75] Inventors: Yoshio Suzuki, Wakoh; Suzaki Yukihiko, Tokyo, both of Japan

[73] Assignee: Honda Giken Kogyo Kabushiki Kaisha, Tokyo, Japan

[21] Appl. No.: 840,584

[22] Filed: Mar. 17, 1986

[30] Foreign Application Priority Data

Mar. 18, 1985 [JP] Japan .................................. 60-052506

[51] Int. Cl.⁴ ............................................. F02M 51/00
[52] U.S. Cl. ........................... 364/431.04; 364/431.11; 371/9; 371/12; 123/479
[58] Field of Search ....................... 364/431.05, 431.06, 364/431.04, 431.11, 133, 134; 371/9, 12; 123/479

[56] References Cited

U.S. PATENT DOCUMENTS

| | | | |
|---|---|---|---|
| 4,030,074 | 6/1977 | Giorcelli | 371/12 |
| 4,198,678 | 4/1980 | Maatje et al. | 364/133 |
| 4,532,594 | 7/1985 | Hosaka et al. | 364/431.11 |
| 4,556,955 | 12/1985 | Wright et al. | 364/133 |

FOREIGN PATENT DOCUMENTS 0224000 12/1984 Japan .
0586457 1/1978 U.S.S.R. .
8101891 7/1981 World Int. Prop. O. .

*Primary Examiner*—Parshotam S. Lall
*Attorney, Agent, or Firm*—Lyon & Lyon

[57] ABSTRACT

An electronic control system for an internal combustion engine, equipped with at least two central processing units for executing control of different operations. Counters are connected to respective ones of the central processing units for individually detecting engine speed, each of which counters counts clock pulses inputted thereto at a predetermined time interval in a predetermined operating state of the engine to thereby detect engine speed. A malfunction in each of the counters is sensed by comparing a counted value recorded by each counter and a respective stored value stored in memory. Each of the operations is enabled to be controlled based on an output from one of the counters when the other of the counters malfunctions.

5 Claims, 5 Drawing Sheets

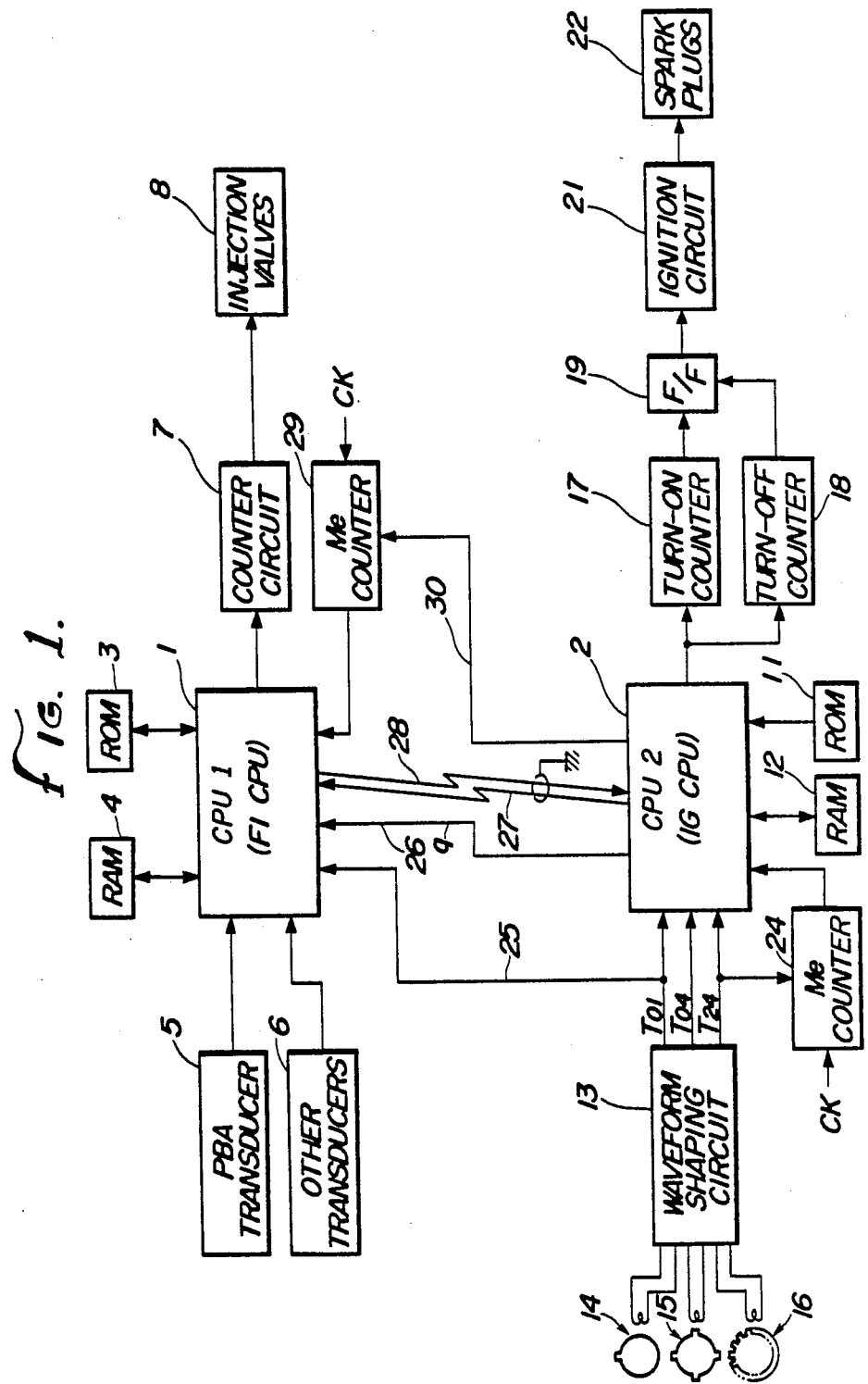

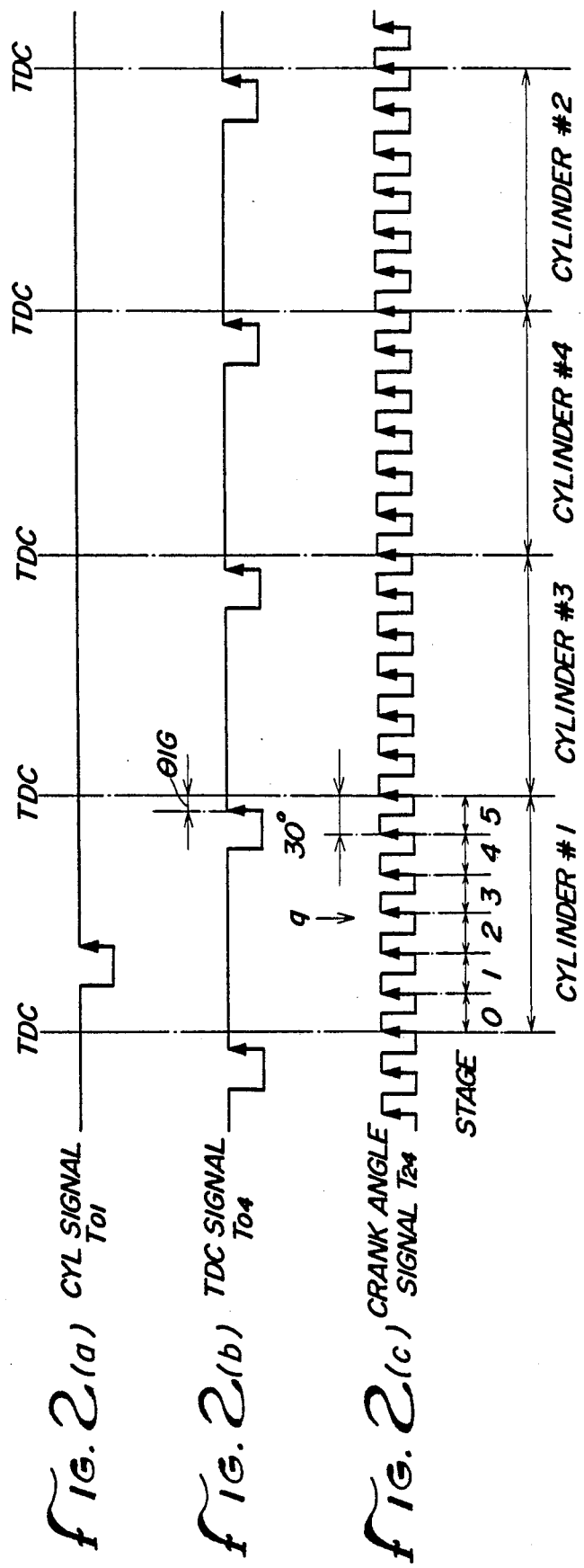

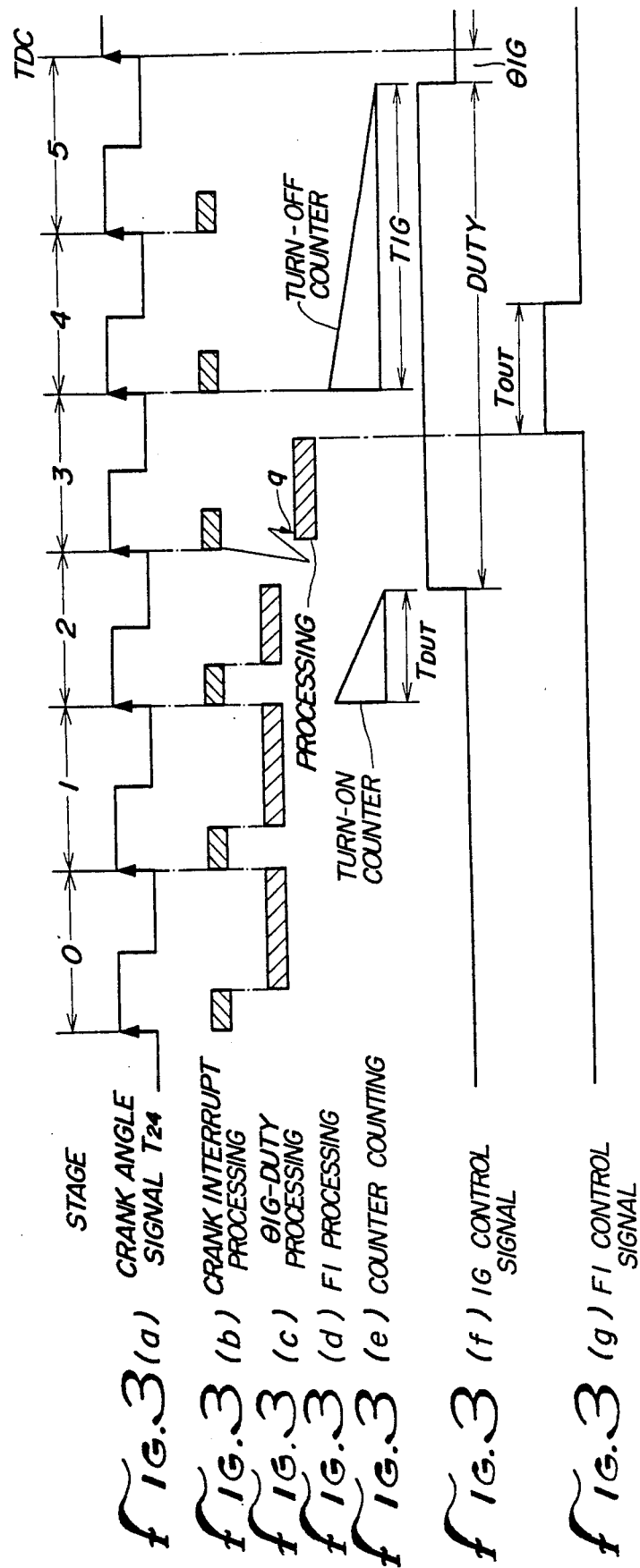

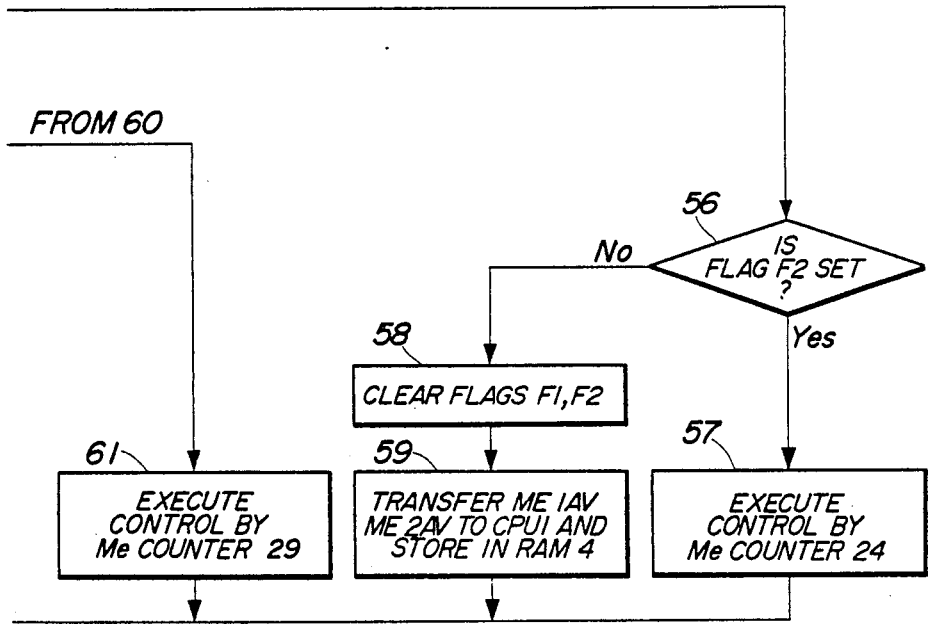

ELECTRONIC CONTROL SYSTEM FOR INTERNAL COMBUSTION ENGINES

BACKGROUND OF THE INVENTION

This invention relates to an electronic control system for internal combustion engines and, more particularly, to an electronic control system which has at least two central processing units for independently controlling at least two operations, and which is capable of determining whether a malfunction has developed in counters connected to respective ones of these central processing units to detect engine speed.

A control system for electronically controlling such items as the amount of fuel injection and ignition timing of an internal combustion engine ordinarily is equipped with a single central processing unit (hereafter referred to as a "CPU") supplied with input signals indicative of various engine operating parameters. These signals include signals representing engine coolant temperature, absolute pressure in the engine intake pipe, a crank angle signal generated whenever the engine crankshaft rotates through a predetermined angular increment, and a reference position signal, two pulses of which are generated per revolution of the crankshaft. On the basis of these input signals, the CPU executes two separate sets of computations, one related to control of fuel ignition quantity and the other related to control of ignition timing.

In recent years efforts have been made to meet the demand for improved drivability. This has resulted in more complex operational programs for each quantity that is to be controlled and, hence, in a heavier processing load upon the CPU. Consequently, when it is attempted to have a single CPU execute the processing needed to control a plurality of quantities, it is no longer possible to deal with an increase in processing load associated with each quantity. In particular, the demand for engine control of greater precision cannot be met at high engine rotation, where the time available for processing is less than that which can be used when the engine is rotating at low speed. Though this demand can in fact be satisfied if use is made of a CPU having a very high processing capability, such as a 32- or 64-bit CPU, this expedient is impractical because of the high cost involved.

An alternative approach is to adopt a control system which uses plural, e.g., two, CPUs to each of which a counter for detecting engine speed is connected so that each CPU may control a different operation based on the value of the count recorded in the corresponding counter. For example, one of two CPUs may be used to control ignition timing and the other to control the fuel injection quantity. When a control system of this type is adopted, a problem can arise if the counted values recorded by the two counters show a disparity because of a malfunction in one of the counters. If this happens, the computations capable of providing the optimum ignition timing and amount of fuel injection will no longer be executed even though the engine operating state is the same. As a result, it will no longer be possible to maintain the engine in the optimum operating state.

SUMMARY OF THE INVENTION

It is therefore an object of the invention to provide an electronic control system for an internal combustion engine, which control system is capable of checking whether a malfunction has developed in each counter connected to a respective one of a plurality of CPUs to separately count engine rpm, and which has the ability to control the operation of the engine even if either of the counters should malfunction.

The present invention provides an electronic control unit for an internal combustion engine, comprising:

at least two central processing units for executing control of different operations;

at least two counters connected to respective ones of the central processing units for individually detecting engine speed;

means connected to the counters and operable when the engine is in a predetermined operating state for inputting clock pulses to each of the counters at a predetermined time interval whereby the each counter counts the clock pulses to thereby detect engine speed in the predetermined operating state of the engine;

memory means storing values representative of normal engine speed as counted values of the counters;

means for sensing a malfunction in each of the counters by comparing a counted value recorded by each counter and a respective stored value stored in memory device; and means for enabling each of the operations to be controlled based on an output from one of the counters when it is sensed that the other of the counters malfunctions.

Thus, according to the first aspect of the present invention, if one of two or more counters should malfunction, the various operations can be controlled by using the normally operating counter or counters.

In another aspect of the present invention, the electronic control system is characterized by comprising:

at least two central processing units for executing control of different operations;

at least two counters connected to respective ones of the central processing units for individually deteting engine speed;

means connected to the counters and operable when the engine is in a predetermined operating state for inputting clock pulses to each of the counters at a predetermined time interval whereby the each counter counts the clock pulses to thereby detect engine speed in the predetermined operating state of the engine;

means for comparing a counted value recorded by each of the counters and a respective value stored in the memory means, deciding that any of the counters is malfunctiong when a difference between the counted value recorded by the counter and the respective stored value in the memory means is greater than a predetermined value; and means for enabling each of the operations to be controlled based on an output from whichever of the counters shows a counted value closest to the predetermined value when it is detected that a or the counters are malfunctioning.

Thus, according to the second aspect of the present invention, the various operations can be controlled based on the counter judged to have the more accurate counted value. This makes it possible to prevent a major decline in engine performance even if the electronic control system becomes faulty owing to a malfunction in a counter.

Other features and advantages of the present invention will be apparent from the following description taken in conjunction with the accompanying drawings.

BRIEF DESCRIPTION OF THE DRAWINGS

FIG. 1 is a block diagram illustrating an embodiment of an electronic control system for an internal combustion engine in accordance with the present invention.

FIGS. 2(a), (b) and (c) are related portions of a timing chart illustrating a signal tive of crank angle position used in the the electronic control system of FIG. 1;

FIGS. 3(a), (b), (c), (d), (e), (f) and (g) are related portions of a timing chart useful in describing processing and control executed by the electronic control system of FIG. 1.

DETAILED DESCRIPTION

Figure 4A:
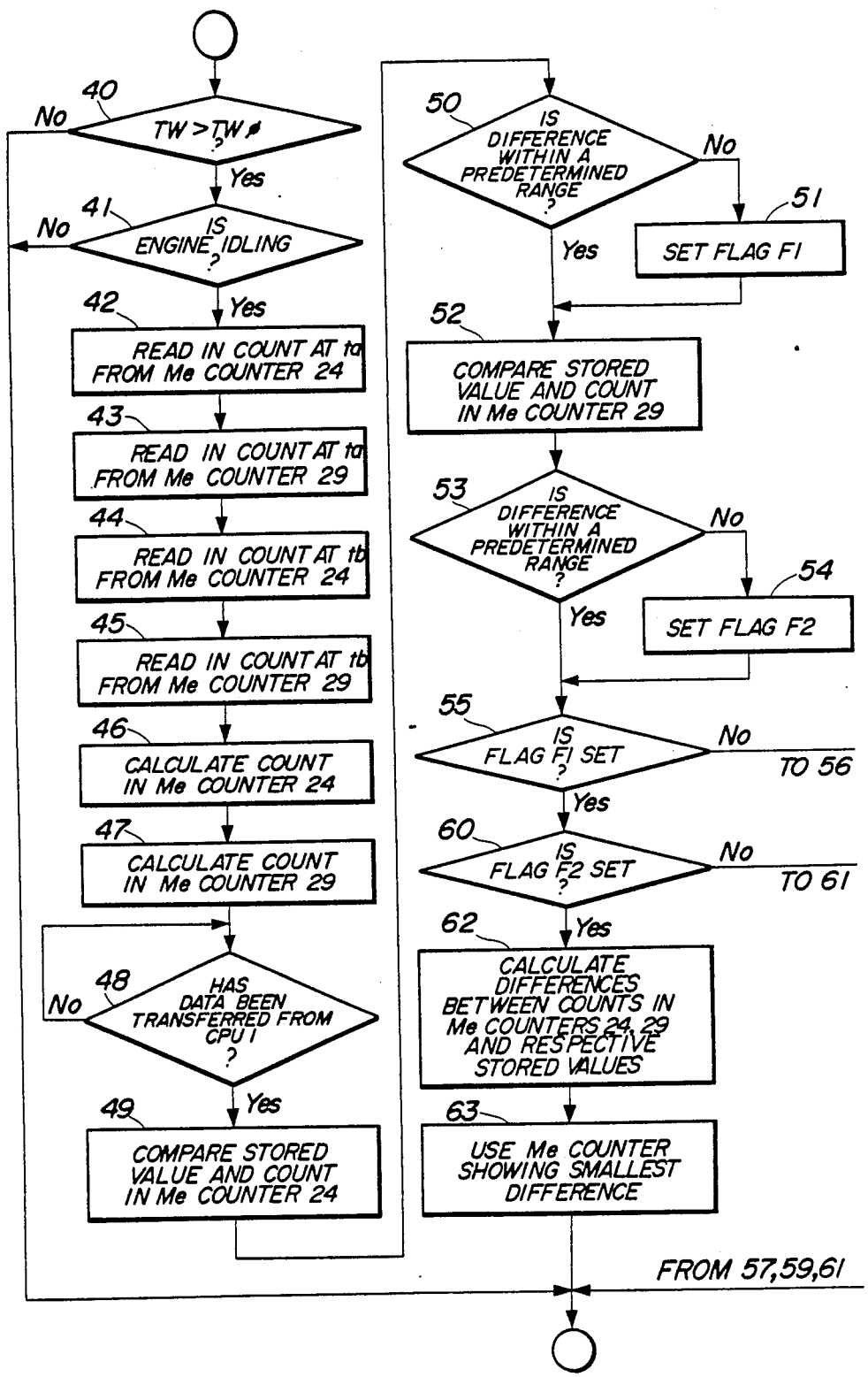
FIG. 4 is a block diagram showing that FIGS. 4A and 4B are combined and that FIS. 4A dna 4B form a flowchart illustrating a procedure for subjecting counters shown in FIG. 1 to a malfunction check.

An embodiment of an electronic control system according to the present invention will now be described with reference to FIGS. 1 through 4.

An electronic control unit (ECU) to which is applied the invention is illustrated in the block diagram of FIG. 1 and includes a built-in first CPU 1 dedicated to controlling.the supply of fuel to an internal combustion engine, nt shown, and a second built-in CPU 2 dedicated to controlling the timing at which a mixture formed by the supplied fuel is ignited inside the engine. The first CPU 1 is equipped with read-only memory (hereafter referred to as a "ROM") 3 wh:ch stores various operational programs executed by the first CPU 1, as well as various tables used in calculating fuel injection quantity, namely lengths of time fuel injection valves 8 are opened to inject fuel into respective engine cylinders, and a non-volatile random-access memory (hereafter referred to as a "RAM") 4 for temporarily storing the results of calculations performed by the first CPU 1. Since the RAM 4 is non-volatile, values stored therein will not be erased when an ignition switch in a vehicle equipped with the ECU is turned off.

Connected to the input side of the first CPU 1 are a PBA transducer 5 for sensing a value of absolute pressure PBA prevailing in the intake pipe (not shown) of the engine and for converting this value into a digital value delivered to the first CPU 1, and a number of other transducers, indicated in FIG. 1 by a single block 6, for sensing the values of such engine operating parameters as intake air temperature TA, engine coolant temperature TW, throttle valve opening 8TH and exhaust gas $O_2$ concentration, and for converting these values into digital values delivered to the first CPU 1.

Connected to the output side of the first CPU 1 is a counter circuit 7 for counting, based on fuel injection time data described below, th lengths of time the fuel injection valves 8 are to be opened. The counter circuit 7 has output lines connected to the respective fuel injection valves 8. It should be noted that each fuel injection valve 8 is provided for each cylinder of the engine. Accordingly, the counter circuit 7 is equipped with counters equal to the number of engine cylinders.

The second CPU 2 is equipped with a ROM 11 and a RAM 12. Connected to the input side of the second CPU 2 is a waveform shaping circuit 13 the input side of which is connected to various sensors. These sensors include a cylinder discriminating (CYL) sensor 14 which, at a predetermined crank angle position of a specific cylinder of the engine, outputs a single pulse of a cylinder discriminating signal T01, a top dead center (TDC) sensor 15 which, at a predetermined crank angle position before top dead center (BTDC) of each cylinder, outputs a reference crank angle signal T04 whenever the engine crankshaft rotates through 180°, and a crank angle sensor 16 which, at a predetermined crank angle position, outputs a single pulse of a crank angle signal T24 whenever the crank shaft rotates through 30°. Connected to the output side of the second CPU in a parallel configuration are a turn-on counter 17 and a turn-off counter 18. The outputs from both of these counters 17, 18 are connected to a flip-flop circuit 19, whose output is applied to an ignition circuit 21. The output of the latter is connected to a spark plug 22. Arranged in the ignition circuit 21 is a well-known timing coil, not shown, comprising a primary coil and a secondary coil. The turn-on and turn-off counters 17, 18 are both down counters. As will be described in detail below, conduction timing data calculated by the second CPU 2 are set in the turn-on counter 17, which is provided with clock pulses for counting down these data in a range of crank angle positions within which conduction of the primary coil is to start (which range shall hereafter be referred to simply as a "conduction stage"), with the downcount starting from the beginning of the particular stage. This is to regulate the conduction commencing timing of the primary coil of ingition circuit 21.

Likewise, ignition timing data calculated by the second CPU 2 are set in the turn-off counter 18, which is provided with clock pulses for counting down these data in a predetermined "ignition stage" from the beginning of this stage. This is to decide the timing at which conduction of the primary coil is to be terminated. Thus, the turn-on counter 17 and turn-off counter 18 in combinationd decide the turn-on timing and turn-off timing of the primary coil in ignition circuit 21, whereby the secondary coil is made to generate a high voltage pulse for firing the spark plug 22.

The waveform shaping circuit 13 has a T24 signal line connected to an Me counter 24, the output whereof is connected to the second CPU 2. The Me counter 24 is reset each time a pulse in the crank angle signal T24 from the waveform shaping circuit 13 is applied thereto and, hence, counts the time interval at which the pulses in the crank angle signal T24 are generated. The second CPU 2 reads in this counted value and uses it to calculate a parameter value Me, which is proportional to the reciprocal of engine rpm Ne. The value Me, which serves as information indicative of engine rpm Ne, is used as a parameter in the calculation of ignition timing.

Various signal lines interconnect the first and second CPUs 1 and 2. These include a signal line 26 for providing the first CPU 1 with a trigger signal q from the second CPU 2 in response to which the CPU 1 starts performing calculations, and communication lines 27, 28 for signal transfer between the CPUs 1, 2. More specifically, communication line 28 transfers such data as engine parameters as well as a transmit instruction signal from the first CPU 1 to the second CPU 2, and the communication line 27 sends a signal from the second CPU 2 to the first CPU 1 confirming that the transmit instruction has been received. Using these communication lines 27, 28, the CPUs 1 2 exchange data indicative of the detected operating parameters that are required.

The second CPU 2 is connected to an Me counter 29 via a line 30 for supplying this counter with a counting start timing signal. The output of Me counter 29 is connected to the first CPU 1. The Me counter 29 is for counting the time interval at which the counting start timing signal is generated, as will be described in greater detail hereinbelow. The first CPU 1 reads in this counted value and uses it to calculate the parameter value Me, which is proportional to the reciprocal of engine rpm Ne. The value Me, which serves as the information indicative of engine rpm Ne, as mentioned above, is used as a parameter in the calculation of uel ignition quantity.

Let us now refer to FIGS. 2(a)–(c) and 3(a)–(g) to describe the operation of the ECU under ordinary operating conditions of the engine. We will start by describing ignition timing control performed by the second CPU 2.

The timing signals from the sensors 14, 15 and 16, namely the cylinder discriminating signal T01, TDC signal T04 and crank angle signal T24, respectively, are fed into the second CPU 2 after first being waveform shaped by the waveform shaping circuit 13. These signals T01, T04 and T24 are illustrated at FIGS. 2 (a), (b) and (c), respectively, in the timing chart The stages shown in FIGS. 2(a)–(c) and 3(a)–(g) refer to the time interval or spacing between the leading edge of each pulse of the crank angle signal T25 and the leading edge of the next pulse. These stages are numbered consecutively from 0 to 5 starting from the first stage. The second CPU 2 executes two programs as programs for controlling ignition timing. One is a crank interrupt handling program FIG. 3(b) executed whenever a pulse in the crank angle signal T24 is generated, and the other is a θIG-DUTY processing program FIG. 3(c) executed following the end of the crank interrupt handling program executed in stage 0. When a pulse in the crank angle signal T24 is inputted to the second CPU 2 during execution of the θIG-DUTY processing, execution of crank interrupt handling takes precedence.

Crank interrupt handling entails executing, based on the TDC signal and crank angle signal, such control operations as determining a conduction stage (stage 2 in the embodiment of FIG. 3) at which the turn-on counter 17 is to start counting as well as a predetermined stage (stage 4 in the embodiment of FIG. 3) at which the turn-off counter 18 is to start, detection of the time interval ME6i at which the crank angle signal T24 is generated, and the starting of the turn-on and turn-off counters, 17, 18.

θIG-DUTY processing, on the other hand, involves computing such data as an advance angle control value θIG, a conduction control value DUTY (the ratio of coil conduction time to the TDC signal generation time interval), conduction timing TDUT and ignition timing TIG.

Let us describe the processing for each ite of the above data in detail. The second CPU 2 calculates the advance angle control value θIG from such values as engine rpm Ne, intake pipe absolute pressure PBA and engine coolant temperature TW in accordance with the following equation (1):

$$\theta IG = \theta MAP + \theta IGCR \quad (1)$$

In Eq. (1), θMAP represents a basic advance angle value read out of a map, which is stored in the ROM 11, from a location decided by the engine rpm Ne and intake pipe absolute pressure PBA. θIGCR represents the value of a variable for correcting the basic advance angle value. θIGCR is read out of a table, stored in the ROM 11, from a location decided by the engine coolant temperature TW, intake air temperature TA and atmospheric pressure PB.

Engine rpm Ne used in calculating the value of θMAP is provided by the Me counter 24. The value Me employs a sum Me (=ME60+ME61+ME62+ME63+ME64+ME65) of values ME60–ME65 obtained by measuring the time intervals of respective stages 0–5 of the crank angle signal T24 shown in FIG. 2(c) and 3(a) using clock pulses (fixed clock pulses) CK having a constant period.

The conduction control value DUTY is a function of engine rpm Ne and is read out of a table stored in the ROM 11 in a manner similar to that mentioned above. The value read out of the table is corrected by the battery voltage before being applied for use.

Ignition is effected in a range of from 0° to 60° BTDC, namely in stage 4 or 5. More specifically, when the data applied to the turn-off counter 18 is counted down to zero by this counter which starts the countdown operation from the leading edge of stage 4, the current being fed into the primary coil of ignition circuit 21 is cut off. Assume that the input value applied to the turn-off counter 18 is TIG. This is a value obtained by an angle-to-time conversion and is found from the advance angle control value θIG and Me value obtained as described above. In addition, the conduction start timing TDUT is a value similarly obtained by an angle-to-time conversion and is decided by the advance angle control value θIG, conduction control value DUTY and the value Me. Thus, the values TIG and TDUT can each be set to any position within a stage. When conduction starting time is reached in a particular stage (stage 2 in the embodiment of FIG. 3), the flip-flop 19 is set by the output of the turn-on counter 17 which starts counting beginning from an instant at which the particular stage starts; when the ignition timing TIG is attained in stage 4, the flip-flop 19 is reset by the output of the turn-off counter 18 which starts counting beginning from an instant at which stage 4 starts.

By being reset, the flip-flop circuit 19 provides the ignition circuit 21 with a signal for terminating conduction of the primary winding. At the instant the flow of current through the primary winding is thus halted, the secondary coil generates the high voltage for ignition to fire the spark plug 22 at the regulated advance angle position.

The first CPU 1 executes an FI (fuel injection) processing program. The first CPU 1 begins executing FI processing upon receiving the aforementioned trigger signal q outputted by the second CPU 2 at stage 3, namely when a crank angle position 90° BTDC is sensed, in the crank interrupt handling process performed by the second CPU 2. According to FI processing, the first CPU 1 reads in such data as the intake pipe absolute pressure PBA from the PBA transducer 5, the throttle valve opening signal θTH and the detected value of O2 concentration in the exhaust gases, reads in data indicative of Me counted by the Me counter 29, calculates fuel injection time TOUT in accordance with the following equation (2):

$$TOUT = Ti \times K1 + K2$$

and, at the same time that the calculation of TOUT ends, controls the start of the counter circuit 7, namely the counter for the predetermined engine cylinder in which fuel injection is to be effected.

In the above equation (2) for TOUT, Ti represents a basic fuel injection time during which the fuel injection valve 8 injects fuel. Ti is read out of the ROM 3 on the basis of, e.g., the intake pipe absolute pressure PBA and engine rpm Ne. K1 and K2 are correction coefficients and correction variables, respectively, calculated in dependence upon engine parameter signals from various parameter sensors such as the aforementioned sensors. K1 and K2 are calculated on the basis of predetermined arithmetic expressions in such a manner that such characteristics as the engine starting characteristic, emission characteristics, fuel consumption and engine acceleration characteristic are optimized in dependence upon the engine operating state.

When the counting start timing signal arrives from the second CPU 2, the value of the count recorded by the Me counter 29 is stored, the counted value in Me counter 29 is reset to zero and the counter 29 again starts counting, all at the moment the timing signal arrives from the CPU 2. Accordingly, the Me counter 20 essentially counts the number of clock pulses CK applied thereto from the moment the T24 signal pulse of the current stage 3 is generated until the moment the T24 signal pulse of the next stage 3 is generated, namely a period of time during which the crankshaft rotates by 180°. When the CPU 1 receives the trigger signal q from the CPU 2, as described above, it reads in the value Me counted by the Me counter 29 and calculates engine rpm Ne from the value Me.

It should be noted that the first CPU 1 executes so-called background processing when it is not executing the FI processing. In background processing, the CPU 1 reads in parameter values other than those read in by the FI processing, examples of these being parameter values such as the engine coolant temperature TW for which the sensed values exhibit little change with time; writes these read parameter values into the RAM 4; and transfers the data stored in RAM 4 to the CPU 2.

The manner of checking whether the two Me counters 24, 29 have developed a malfunction, as well as control performed when a malfunction occurs, will now be described with reference to the flowchart of FIGS. 4A and 4B.

Checking of the two Me counters 24, 29 for a malfunction is performed when the engine is in a predetermined operating state, namely a state in which the engine coolant temperature has attained a predetermined value, thereby indicating the completion of engine warming-up, and the engine is idling. The reasons for this are twofold; first, since engine rpm Ne is counted separately by the two Me counters 24, 29, it is necessary that the engine operating state, namely rpm, be stable; second, low engine speed is required since this will lengthen the time available for background processing executed by the CPUs.

Step 40 of the flowchart in FIG. 4A calls for a determination as to whether engine coolat temperature TW has reached a predetermined value TW$\phi$. If it the answer is NO, the present program is ended and the Me counters 24, 29 are not checked for malfunction. If a YES answer is obtained at the step 40, then it is determined at th.next step 41 whether the engine is idling. If the decision here is negative, the present program ends without subjecting the Me counters 24, 29 to a malfunction check, just as above. If the engine is found to be idling at the step 41, the program proceeds to a step 42. The determination at step 41 as to whether or not the engine is in the idling state is based on one of three decisions, namely whether the engine rpm Ne is less than idling rpm NIDL, whether the throttle valve opening $\theta$TH indicates that the throttle valve is fully closed, and whether the absolute pressure PBA in the intake pipe is less than a predetermined value BIDL at engine idling. Thus, whether the engine is in a specific operating state, namely whether the engine has reached the completion of warming-up and is in the idling operating state, is decided by the steps 40, 41. Note that it is permissible to determine at step 41 whether or not an electrical load is being applied and whether an air conditioner is operating or not. If a load is being applied, or if the air conditioner is operating, then a decision can be rendered at step 41 to the effect that the engine is not in the specific operating state, even if the engine is idling.

The step 42 calls for the second CPU 2 to read in the value of the count prevailing in the Me counter 24 at a given instant ta. Simultaneously, the first CPU 1 reads in the counted value in Me counter 29 at a step 43. Next, at a step 44, the CPU 2 reads in the value of the count in the Me counter 24 at an instant tb, which occurs a predetermined period of time Ta i.e. tb=ta+Ta after the instant ta. Simultaneously, the CPU 1 reads in the value of the count in Me counter 29 at a step 45. The time period Ta is set to a predetermined value shorter than the time interval at which the pulses of the TDC signal T04 are generated when the engine is idling, by way of example. It should be noted that the counted values in the Me counters 29, 24 of the respective CPUs 1, 2 need not necessarily be read in synchronously.

Next, the program proceeds to a step 46 where, based on the counted value read in from the Me counter 24 at the step 42 and the counted value read in from this same counter at the step 44, the CPU 2 calculates a counted value ME2 recorded by the Me counter 24 during the period of time Ta. Then, at step 47, the CPU 1 similarly calculates a counted value ME1 recorded by the Me counter 29 during the period of time Ta, this calculation being based on the two counted values read in from the Me counter 29 at the steps 43, 45. This is followed by a step 48, at which the CPU 2 determines whether the counted value ME1, calculated at the step 47, and respective average values ME2AV, ME1AV of values ME2, ME1 have been transferred from the CPU 1 to the CPU 2 and stored in the RAM 12 of CPU 2. If the decision at the step 48 is that these data have not been transferred, then the transfer of these data from the CPU 1 to the CPU 2 is awaited. When a YES answer is obtained at the step 48, the program proceeds to a step 49, where the value ME2AV (the average value of ME2) transferred from the CPU 1 and stored in a non-volatile memory, such as the RAM 12, is compared with the counted value ME2 in Me counter 24, which value was calculated at the step 46. It is then determined at a step 50 whether the difference between these two values falls within a predetermined range.

When a NO answer is obtained at the step 50, the CPU 2 decides at a step 51 that the Me counter 24 is faulty and sets a flag F1 indicating a malfunction. If the decision at the step 50 is YES, then the program proceeds to a step 52. This step calls for the CPU 1 to compare the counted value ME1 in counter Me 29, whic was calculated at the step 47, and the value ME1AV transferred from the CPU 1 and stored in the RAM 12. It is then determined at a step 53 whether the difference between these two values falls within a predetermined range.

When a NO answer is obtained at the step 53, the CPU 1 decides at a step 54 that the Me counter 29 is faulty and sets a flag F2 indicating a malfunction. If the decision at the step 53 is YES, then the program proceeds to a step 55, This step calls for the CPU 2 to determine whether the flag F1 has been set, i.e., whether the Me counter 24 is operating normally or not. If the answer is that the flag F1 has not been set, namely that Me counter 24 is normal, then it is determined at a step 56 (see FIG. 4B) wheter the flag F2 has been set, i.e., whether the Me counter 29 is operating normally or not. If the answer here is that the flag F2 has been set, namely that the Me counter 29 is abnormal, then the program proceeds to a step 57, at which a command is issued to the effect that the various operations controlled by the ECU are to be executed on the basis of the output from the normal Me counter 24. The present program is ended following execution of the step 57. If a negative decision is rendered at the step 56, this means that both of the e counters 24, 29 are operating normally. Accordingly, the flags F1, F2 are cleared at a step 58 (see FIG. 4B). Then, at a step 59, new average values ME1AV, ME2AV are calculated by a well-known method from the counted values ME1, ME2 of the respective Me counters 29, 24 just calculated in the current loop, and the average values ME1AV, ME2AV stored in the RAM 4 of CPU 1, and these new average values are transferred to the CPU 1 and stored in RAM 42. The present program is ended after the execution of the step 59.

If the answer to the step 55 is that the flag F1 has been set, namely that the Me counter 24 is abnormal, then the program proceeds to a step 61 (see FIG. 4B), at which a command is issued to the effect that the various operations controlled by the ECU are to be executed on the basis of the output from the normal Me counter 29. The present program is ended following execution of the step 61. If the answer is YES at the step 60, namely if it is determined that both of the Me counters 24, 29 are faulty, then the difference between the counted value ME1, ME2 in each of the Me counters 24, 29 and the respective stored value ME1AV, ME2AV is calculated at a step 62 (see FIG. 4A). Then, at a step 63, a command is issued calling for use of the Me counter giving the smaller difference, namely the Me counter determined to be the more accurate. This step is followed by ending the present program.

It should be noted that although as stated before the average values ME1AV, ME2AV used in steps 49, 52 and the like are average values of counted values obtained from the Me counters 24, 29 when these counters are operating normally in the aforementioned particular operating state of the engine such as during engine idling, the average values may be replaced by constant values which have been determined empirically or experimentally as values obtainable when the counters are normal.

As many apparently widely different embodiments of the present invention can be made without departing from the spirit and scope thereof, it is to be understood that the invention is not limited to the specific embodiments thereof except as defined in the appended claims.

What is claimed is:

1. An electronic control system for an internal combustion engine, comprising:
    at least two central processing units for executing control of different operations;
    at least two counters connected to respective ones of said central processing units for individually detecting engine speed;
    means connected to said counters and operable when the engine is in a predetermined operating state, wherein the engine operation is steady, for inputting clock pulses to each of said counters at a predetermined time interval whereby said each counter counts said clock pulses to thereby detect engine speed in said predetermined operating state of the engine;
    memory means storing values representative of normal engine speed in said predetermined operating state as counted values of said counters;
    means for sensing a malfunction in each of said counters by comparing a counted value recorded by a counter and a respective stored value stored in said memory device; and
    means for enabling each of the operations to be controlled based on an output from one of said counters when it is sensed that the other of said counters malfunctions.

2. An electronic control system as claimed in claim 1, wherein said predetermined operating state of the engine is a state in which engine coolant temperature is above a predetermined value and the engine is idling.

3. An electronic control system as claimed in claim 1, wherein said memory means is a non-volatile memory connected to at least one of said central processing units.

4. An electronic control system as claimed in claim 1, wherein said values stored in said memory means are average values of respective counted values obtained by said counters when said counters are operating normally in said predetermined operating state of the engine.

5. An electronic control system for an internal combustion engine, comprising:
    at least two central processing units for executing control of different operations;
    at least two counters connected to respective ones of said central processing units for individually detecting engine speed;
    means connected to said counters and operable when the engine is in a predetermined operating state, wherein the engine operation is steady, for inputting clock pulses to each of said counters at a predetermined time interval whereby said each counter counts said clock pulses to thereby detect engine speed in said predetermined operating state of the engine;
    memory means storing values representative of normal engine speed in said predetermined operating state as counted values of said counters;
    means for comparing a counted value recorded by each of said counters and a respective valve stored in said memory means, deciding that any of said counters is malfunctioning when a difference between the counted value recorded by the counter and the respective stored value in said memory means is greater than a predetermined value; and
    means for enabling each of the operations to be controlled based on an output from whichever of said counters shows a counted value closest to the predetermined value when it is detected that all of said counters are malfunctioning.

* * * * *